Aug. 4, 1936.　　　　P. C. TEMPLE　　　　2,049,549
REGULATOR
Filed June 17, 1935　　　4 Sheets-Sheet 2
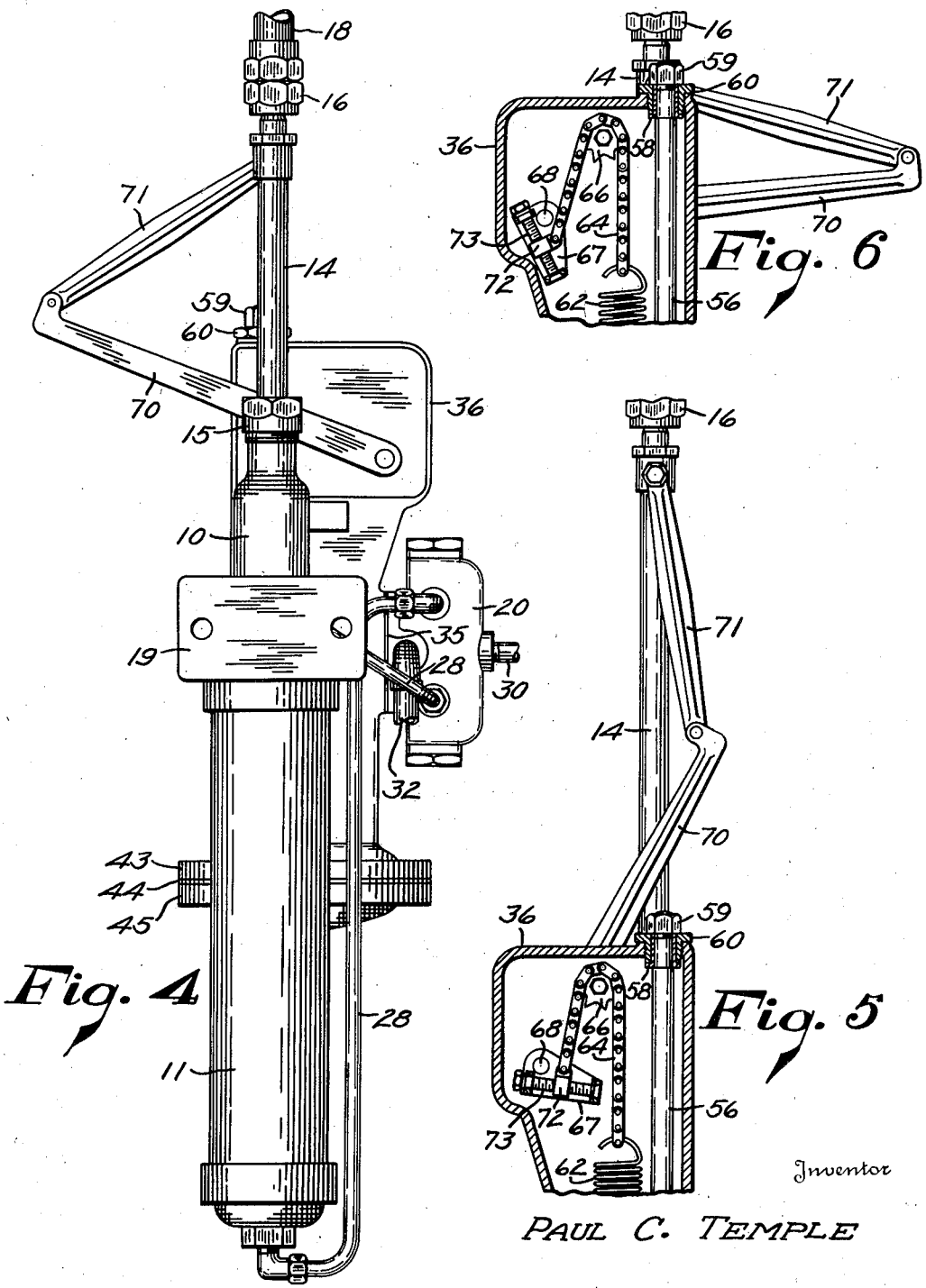
Inventor
PAUL C. TEMPLE
By Albert G. Blodgett
Attorney Aug. 4, 1936.  P. C. TEMPLE  2,049,549
REGULATOR
Filed June 17, 1935  4 Sheets-Sheet 3

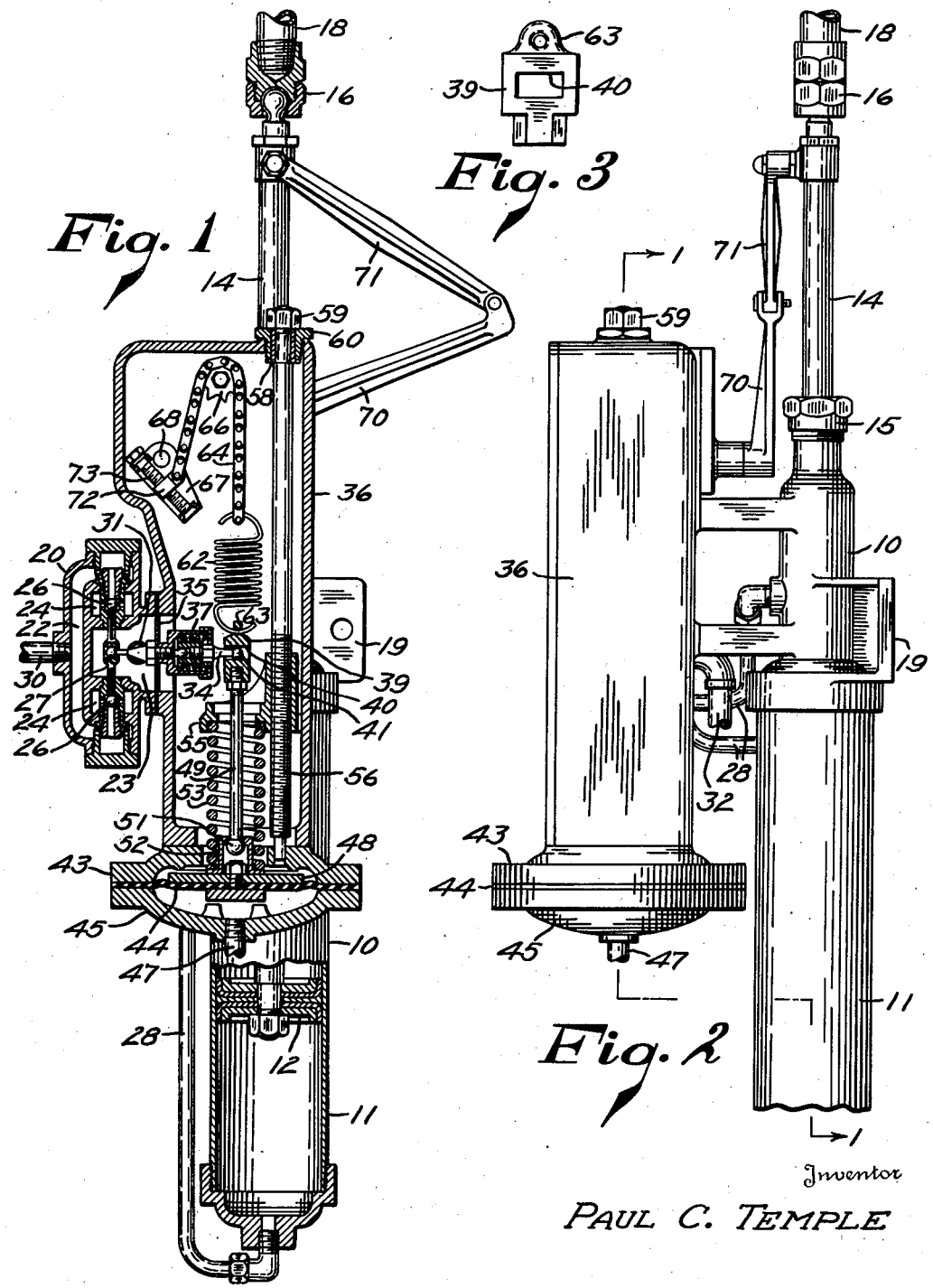

Inventor
PAUL C. TEMPLE
By Albert G. Blodgett
Attorney

Aug. 4, 1936.  P. C. TEMPLE  2,049,549
REGULATOR
Filed June 17, 1935  4 Sheets-Sheet 4
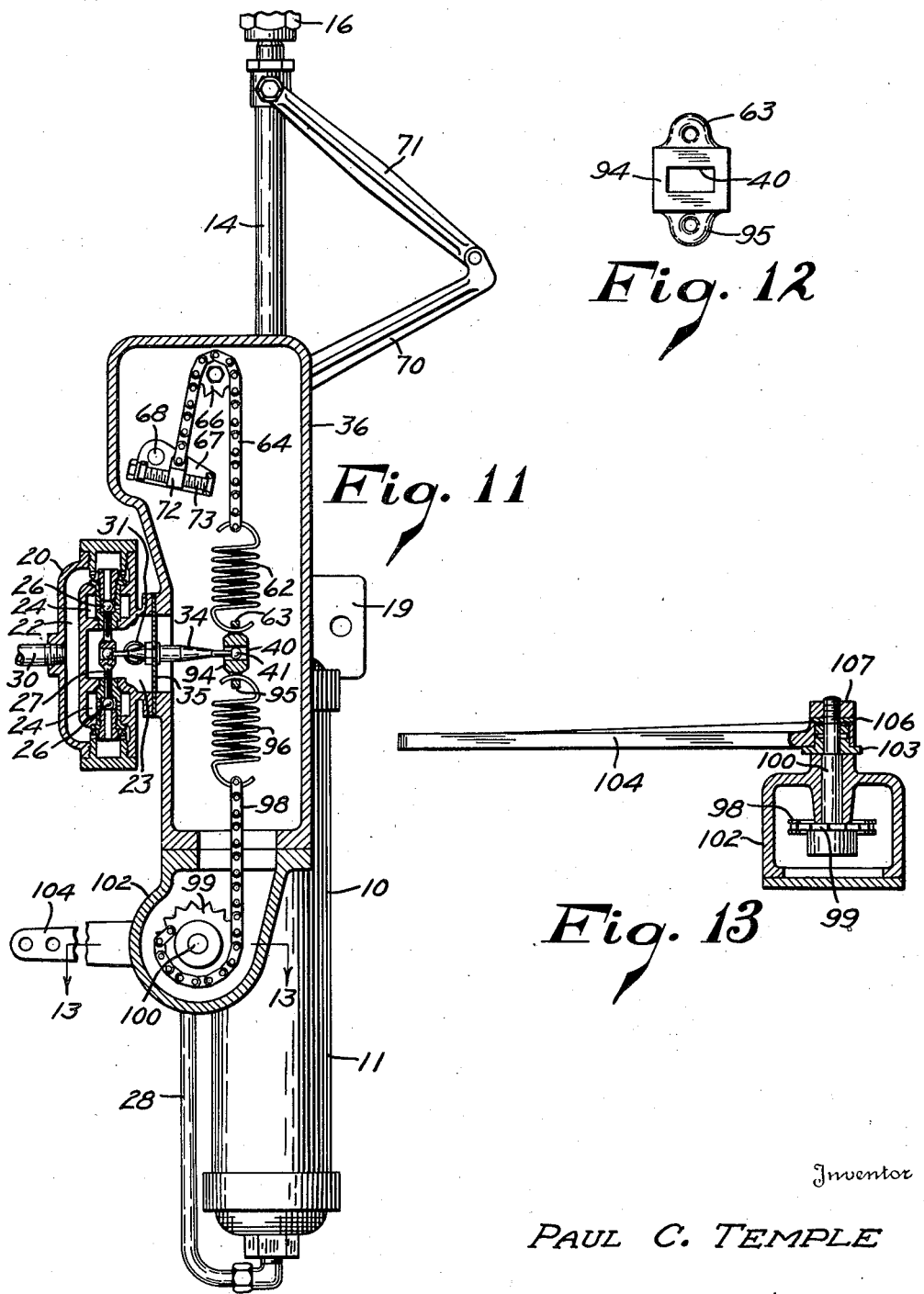

Patented Aug. 4, 1936

2,049,549

UNITED STATES PATENT OFFICE 2,049,549

REGULATOR

Paul C. Temple, Decatur, Ill., assignor to A. W. Cash Company, Decatur, Ill., a corporation of Delaware Application June 17, 1935, Serial No. 26,931

19 Claims. (Cl. 121—41)

This invention relates to regulators, and more particularly to regulators of the compensating type having a motor arranged to assume different positions under the control of a pilot device, the pilot device being actuated jointly by a control device and by a compensating mechanism connected to the motor. The control device may be subjected to a variable fluid pressure.

Regulators of this type as heretofore constructed have lacked the desired sensitivity and reliability of operation. It is found in practice that the motor does not always respond to slight movements of the control device or to slight changes in the fluid pressure, and that the positions assumed by the motor do not always bear a definite and predetermined relationship to the position of the control device or to the pressure thereon. Furthermore, many of the constructions heretofore proposed have been complicated and expensive to manufacture, and frequently so bulky as to require a considerable amount of space at installation. Regulators are frequently used to actuate such devices as dampers, valves, rheostats, etc., having widely different operating characteristics, and prior regulators have lacked provision for adjustment to enable them to give the best results in connection with particular devices.

It is accordingly one object of the invention to provide a regulator of the compensating type which will be extremely sensitive in operation and which will respond to very slight changes in the position of its control device or in the fluid pressure thereon.

It is a further object of the invention to provide a regulator of the compensating type which will be extremely reliable in operation, and so constructed and arranged that its motor will assume positions which will always bear a definite and predetermined relationship to the position of its control device or to the fluid pressure thereon.

It is a further object of the invention to provide a regulator of the compensating type which will be compact, powerful, simple of construction, and inexpensive to manufacture.

It is a further object of the invention to provide a regulator of the compensating type which can be readily adjusted to cooperate in a desired manner with various devices having widely different operating characteristics.

It is a further object of the invention to provide a regulator of the compensating type which will respond to variations in a controlling fluid pressure, and which can be adapted with slight changes to a wide range of pressures.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a section through a regulator of the compensating type arranged to respond to fluid pressure variations, the section being taken on the line 1—1 of Fig. 2;

Fig. 2 is a side elevation of the regulator;

Fig. 3 is a detail of the member which actuates the pilot valve lever;

Fig. 4 is a rear elevation of the regulator;

Fig. 5 is a fragmentary sectional view showing the position of the compensating mechanism when the motor piston is at its upper limit of travel;

Fig. 6 is a view similar to Fig. 5 showing the position of the compensating mechanism when the motor piston is at its lower limit of travel;

Fig. 11 is a view similar to Fig. 1, showing a regulator having a mechanically actuated control device;

Fig. 12 is a detail of the member which actuates the pilot valve lever in Fig. 11; and Fig. 13 is a section on the line 13—13 of Fig. 12.

Figure 7:
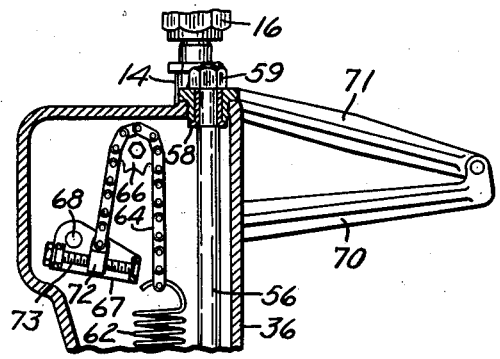
Fig. 7 is a view similar to Fig. 6 showing the compensating mechanism slightly modified.

The embodiment illustrated in the drawings comprises a motor 10 which is preferably of the reversible hydraulic type. This motor is provided with a cylinder 11 shown with its axis vertical, a piston 12 slidable within the cylinder, and a piston rod 14 extending upwardly from the piston and through a guideway and stuffing box 15 at the upper end of the cylinder. The piston rod 14 is connected by means of a ball-and-socket joint 16 to a rod 18, which may connect with the valve, damper or other device to be controlled. The motor 10 is provided at the rear with a bracket 19 which may be attached to any suitable supporting structure.

The movements of the motor piston 12 are controlled by a suitable pilot device 20. For this purpose I preferably utilize a four-way valve mechanism of the type shown in my prior Patent No. 1,992,048 granted February 19, 1935. This valve mechanism comprises walls forming an inlet chamber 22, an exhaust chamber 23 and two intermediate chambers 24. Communication between the intermediate chambers and the inlet and exhaust chambers is controlled by a pair of ball valves 26 which are actuated by a vertically reciprocable valve stem 27. The intermediate chambers 24 are connected to the opposite ends of the cylinder 11 by means of tubes 28. A suitable fluid, such as oil, is delivered under pressure to the inlet chamber 22 through a pipe 30, and oil is free to escape from the exhaust chamber 23 through an opening 31 to which a pipe 32 is connected. The valve stem 27 is actuated by means of a horizontal lever 34 fulcrumed on a thin flexible metal plate 35 which forms one wall of the exhaust chamber 23. One end of the lever engages the valve stem 27, and the other end extends into a casing 36 which is mounted on the front of the motor 10. The lever may be provided with a yieldable joint 37 of the type disclosed in my prior application Serial No. 744,948, filed September 24, 1934.

The lever 34 is actuated jointly by a control device and by a compensating mechanism connected to the motor 10. For this purpose there is provided a member 39 which is subjected to a tensile stress by applying thereto two directly opposed and substantially equal forces, one of which is varied by a control device and the other of which is varied by a compensating mechanism. This member 39 is provided with a laterally extending recess 40 having plane horizontal upper and lower surfaces and arranged to receive a spherical end portion 41 on the lever 34. With this construction the lever contacts with the member 39 at two points only, and will respond to vertical movements of the member but not to lateral movements thereof.

In the embodiment illustrated in Figs. 1 to 6 inclusive, there is provided a control device which is subjected to a variable fluid pressure higher than atmospheric pressure. As shown particularly in Fig. 1, a flanged annular plate 43 is secured to the lower end of the casing 36, and a flexible diaphragm 44 is clamped at its periphery between the plate 43 and a flanged hood 45 therebeneath. The hood 45 is provided with an opening to receive a pipe 47, through which a variable fluid pressure may be transmitted to the lower surface of the diaphragm 44. A pressure plate 48 is mounted in contact with the upper surface of the diaphragm. A vertical rod 49 is connected at its upper end to the tension member 39, and the lower end of the rod is provided with a spherical enlargement 51 which engages a flanged socket member 52. This socket member is held against the pressure plate 48 by means of a coiled compression spring 53 concentric with the rod 49 and supported at its upper end in a saddle 55 mounted on a vertical screw-threaded rod 56 at one side of the spring. This rod is rotatably mounted in the casing 36, and is held against axial movement by a flanged sleeve 58 secured to its upper end by a nut 59, the sleeve being supported by a hollow plug 60 screw-threaded to the casing. By turning the nut 59, the rod 56 can be rotated, thus raising or lowering the saddle 55 to vary the deflection of the spring 53. This spring 53 is adjusted to produce a downward loading on the diaphragm 44 somewhat in excess of the upward force resulting from the fluid pressure on the lower surface of the diaphragm. Consequently the rod 49 is placed in tension and applies a direct downward force to the member 39.

This downward force is balanced by a substantially equal upward force which is applied by means of a compensating mechanism. For this purpose I provide a coiled tension spring 62 arranged in axial alignment with the rod 49 and attached at its lower end to an apertured lug 63 formed on the top of the member 39. The upper end of the spring 62 is connected to one end of a flexible roller chain 64 which extends upwardly in alignment with the spring and passes over an idler sprocket wheel 66 rotatably supported in the casing 36. The other end of the chain is connected to a short arm 67 which is secured to a shaft 68 rotatably supported in the casing and extending through the rear wall thereof. A long arm 70 is secured to the rear portion of the shaft 68, and the outer end of this long arm is connected to the piston rod 14 by means of a link 71. These parts are so arranged that downward movement of the piston rod will cause the arm 70 to swing downwardly, and the tension of the spring 62 will be increased. It will be apparent that the arms 67 and 70, and the shaft 68, form a pivotally supported lever.

It is desirable to provide means for adjusting the operating range of the regulator, which may be defined as the amount of change in the loading afforded by the control device required to move the regulator piston 12 from one end of its stroke to the other. In the embodiment illustrated in Fig. 1, this change in the loading is effected by variations in the fluid pressure applied to the diaphragm 44. In order to make this adjustment possible, I provide means for varying the effective length of the lever arm 67. For this purpose the chain 64 is connected to a nut 72 mounted on a screw 73, the screw being rotatably supported on the arm 67. By turning the screw 73 it is possible to move the nut 72 therealong, and vary the radial distance between the center of the shaft 68 and the end of the chain. If the end of the chain is brought into alignment with the shaft center, the operating range will be zero, and under these conditions if the fluid pressure transmitted by the pipe 47 departs from normal even in a very slight degree, the regulator piston will travel to one end of its stroke. On the other hand, the regulator can be given a substantial operating range when required.

Regulators of this type are frequently used for operating valves, dampers, etc., which are usually very sensitive when nearly closed. A slight movement of a valve or damper when near its closed position has a much greater effect upon the flow and pressure of the fluid than a similar movement near open position. This tends to cause hunting of the regulator. In order to avoid this difficulty, I arrange the compensating mechanism in such a way as to produce a variable compensating action which increases as the valve or damper approaches closed position. In the ordinary installation, the closed valve position corresponds to the upper limit of fluid pressure in the pipe 47, and when this limit is reached the piston rod 14 will be in its uppermost position. For such an installation I therefore so mount the arm 67 on the shaft 68 that this arm will be substantially at right angles to the adjacent portion of the chain 64 when the piston is at the top of its stroke and the screw 73 is adjusted for a range about half-way between the maximum and the minimum, as shown in Fig. 5. When the piston is at the bottom of its stroke, the arm 67 will make a comparatively sharp acute angle with the adjacent portion of the chain, as shown in Fig. 6, and the compensating action will be greatly reduced. This construction will cause the movements of the valve or damper for a given change in control pressure to be much smaller near closed position than near open position, thus avoiding all tendency toward hunting.

The operation of this embodiment of the invention will be apparent from the above disclosure. The downward force provided by the compression spring 53 is normally balanced by the upward force provided by the tension spring 62 and by the fluid pressure effective on the lower surface of the diaphragm 44. Under these conditions the pilot valve 20 will be in neutral position and the piston 12 will remain stationary. A very slight increase in the fluid pressure will raise the diaphragm and tip the lever 34. This will lower the valve stem 27 and admit oil to the lower end of the cylinder 11, at the same time exhausting oil from the upper end of the cylinder. The piston 12 will move upwardly, swinging the lever arms 70 and 67 upwardly, and causing the chain 64 to lower the upper end of the tension spring 62. This will decrease the tension which is applied by the spring 62 to the member 39 and rod 49, and as a result the compression spring 53 will force the diaphragm downwardly, carrying the rod 49 and member 39 with it. The pilot valve 20 will thus be returned to neutral position and the piston will come to rest. Similarly, a decrease in the fluid pressure will cause downward movement of the piston. To maintain the pilot valve in neutral position, the forces on the diaphragm must be in equilibrium, with the downward force of the compression spring 53 balanced against the sum of the upward force applied by the fluid pressure and the upward force applied by the tension spring 62. Since the spring 62 is connected to the piston by means of the compensating mechanism, the spring tension is a function of the position of the piston. Consequently the position of the piston will always bear a definite and predetermined relationship to the pressure supplied through the pipe 47. Because of the novel arrangement of the compensating mechanism, a given change in fluid pressure will cause the piston to move a much greater distance when near the bottom of its stroke than when near the top of its stroke. This makes it possible to obtain very satisfactory control over the movements of dampers, valves, etc., which are very sensitive when nearly closed.

In a few cases, as for example in relief valve installations in which the regulator is controlled by the pressure anterior to the valve, the closed position of the valve will correspond to the lower limit of fluid pressure, and under these conditions the regulator piston will be in its lowermost position. For such installations I so mount the arm 67 on the shaft 68 that this arm will be substantially at right angles to the adjacent portion of the chain 64 when the piston is at the bottom of its stroke, with an intermediate adjustment of the operating range, as shown in Fig. 7. With this arrangement, the chain 64 may be made somewhat shorter, to ensure maintenance of adequate tension in the spring 62.

It will be noted that the rod 49, the member 39, the spring 62, and the chain 64 are all stressed in direct tension and hence remain in correct alignment regardless of possible tipping of the diaphragm. The lever 34 will respond only to vertical movements of the member 39, and if there should be a slight lateral movement of this member it cannot cause any binding or friction. In fact the only friction which resists diaphragm movement and affects sensitivity is that of the pilot valve itself, and this valve is of the seating type and practically frictionless. The compensating mechanism is actuated entirely by the motor 10 and not by the diaphragm. Hence, any slight friction present in the lever bearing pin 68 or the other parts of the compensating mechanism will have no effect on the sensitivity of the regulator. The regulator is so sensitive that while it can be constructed for very high pressures, such as for example 600 pounds per square inch, it will reverse its movement upon pressure changes as slight as three-tenths of an inch water column. The slightest movement of the diaphragm is sufficient to produce piston movement, and the diaphragm always returns to its original position when a balanced condition is attained. This fact is of great advantage in constructing regulators for high pressures, since a comparatively small diaphragm can be used, and a comparatively small spring will balance the load. The piston 12 is actuated by fluid pressure in both directions, and the regulator can be used for operating heavy dampers or other apparatus requiring considerable power. The regulator can be mounted in any desired position.

Figure 8:
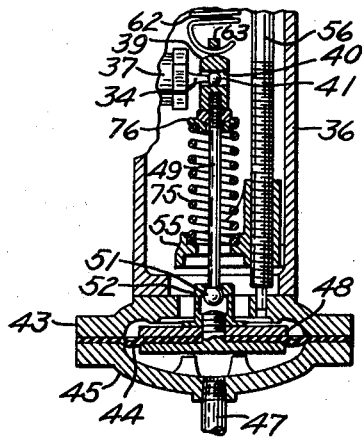
Fig. 8 is a fragmentary view in section showing a modified form of regulator arranged to respond to control pressures below atmospheric.

In case the controlling fluid pressure is below atmospheric, the construction illustrated in Fig. 8 may be utilized. This construction is similar to that shown in Fig. 1, except that the spring 53 is omitted, and a coiled compression spring 75 is provided above the saddle 55 and surrounding the rod 49. The lower end of the spring 75 engages the saddle 55, and the upper end engages a spring button 76 mounted on the rod 49. The socket member 52 is secured to the diaphragm 44, and the downward pressure of the atmosphere on the upper surface of the diaphragm is balanced by the combined forces of the springs 62 and 75. The regulator operates in a similar manner to that shown in Fig. 1.

Figure 9:
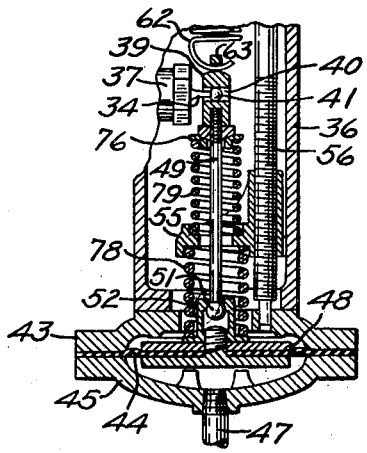
Fig. 9 is a fragmentary view in section showing a modified form of regulator which can be adjusted to respond to control pressures either above or below atmospheric.

In some cases the regulator may be required to function through an operating range which includes atmospheric pressure, or it may be desirable to provide a regulator which may be adjusted to maintain a pressure either below or above atmospheric. For this purpose, I may use the construction illustrated in Fig. 9, in which a coiled compression spring 78 is provided below the saddle 55 and a second coiled compression spring 79 is provided above the saddle. The spring 78 imparts a downward force to the diaphragm, and the spring 79 imparts an upward force thereto. The resultant of these two forces may be downward or upward, depending upon the adjustment of the saddle 55. This construction will operate in a manner similar to that shown in Fig. 1.

Figure 10:
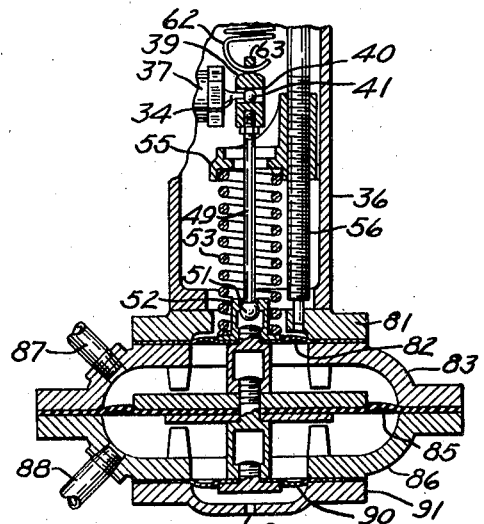
Fig. 10 is a fragmentary view in section showing a modified form of regulator arranged to respond to a fluid pressure differential.

In the event the regulator is required to respond to a pressure differential, I may use the construction illustrated in Fig. 10, which is similar to that shown in Fig. 1 except for the arrangement of the diaphragms. An annular plate 81 is secured to the lower end of the casing 36, and a small sealing diaphragm 82 is clamped peripherally between this plate and a flanged hood 83 therebeneath. A main diaphragm 85 is clamped peripherally between the hood 83 and a lower flanged hood 86 therebeneath. Pipes 87 and 88 conduct pressure fluid to the space above and below the main diaphragm. If very accurate control of the pressure differential is required, I may provide a second sealing diaphragm 90 below the main diaphragm and clamped peripherally between the lower hood 86 and a plate 91. The plate 91 is vented at 92. The sealing diaphragms 82 and 90 are preferably of equal area, and all three diaphragms are connected at their central portions. With this construction, the main diaphragm will respond solely to changes in the difference between the pressures on its upper and lower surfaces, irrespective of the actual value of these pressures, because the balancing effect of each sealing diaphragm on the other. The higher of the two pressures is supplied through the lower pipe 88.

In some cases it is desirable to provide a regulator having a mechanically actuated control device. For this purpose I may utilize the construction shown in Figs. 11 to 13 inclusive. As illustrated, the yieldable joint 37 may be omitted, and the valve control lever 34 may be actuated by a tension member 94 similar to the member 39 but provided with an additional apertured lug 95 on its lower end to engage the upper end of a coiled tension spring 96 similar to the spring 62. The lower end of the spring 96 engages a flexible roller chain 98 secured to a sprocket wheel 99. The wheel 99 is secured to a horizontal shaft 100 rotatably supported in a casing 102 fastened to the lower end of the casing 36. The shaft 100 extends rearwardly outside of the casing 102, and a flanged hub 103 is pinned to the extended portion of the shaft. A lever arm 104 is clamped to the hub 103 by means of a washer 106 and a nut 107 screw-threaded to the rear end of the shaft. These parts are so arranged that the arm 104 can be mounted in any desired angular relationship with the shaft and the sprocket wheel. At installation this angular relationship is adjusted to place the arm 104 in a desired limiting position with the valve lever 34 in neutral position and the motor piston at one end of its stroke.

The regulator illustrated in Fig. 11 is provided with a compensating mechanism similar to that of Fig. 1, but adjusted to give approximately straight-line compensation. That is, equal angular movements of the operating lever 104 will produce approximately equal linear movements of the motor piston throughout the operating range. In order to obtain this result, I so mount the arm 67 on the shaft 68 that this arm will be substantially at right angles to the adjacent portion of the chain 64 when the piston is at the center of its stroke, with an intermediate adjustment of the operating range. If the regulator is used to operate a valve or damper, it may be desirable to mount the arm 67 in a different position, as shown in Figs. 1 or 7.

It will now be apparent that the arm 104 can be actuated either manually or automatically, and that a movement of this arm will vary the tension of the spring 96 and cause the valve lever 34 to leave neutral position. This will actuate the pilot valve 20 and cause the motor piston to move, at the same time readjusting the tension of the spring 62 by means of the compensating mechanism. As soon as the spring 62 has been readjusted sufficiently to bring the valve lever 34 back to neutral position, movement of the motor will cease. The position of the motor piston will bear a definite and predetermined relationship to the position of the arm 104, irrespective of the load applied to the motor. The regulator functions as a powerful relay or power amplifying mechanism. It will be noted that the chains 64 and 98, the springs 62 and 96, and the member 94 are all in tension and self-aligning. No lateral stresses can be applied to the valve lever 34. The regulator is practically frictionless, and extremely sensitive and reliable.

Having thus described my invention, what I claim as new and desire to secure by Letters Patent is:

1. A regulator comprising a motor, a pilot device to control the motor, a member connected to the pilot device to actuate the same, means to subject said member to a tensile stress by applying thereto two directly opposed and substantially equal forces, a control device to vary one of said forces, and means actuated by the motor to vary the other of said forces, the member being free to align itself with said forces.

2. A regulator comprising a motor, a pilot device to control the motor, a tension member, means to subject said member to a tensile stress by applying thereto two directly opposed and substantially equal forces, a control device to vary one of said forces, means actuated by the motor to vary the other of said forces, and connections between the tension member and the pilot device arranged to respond to movements of the tension member in the line of said forces, the tension member being free to align itself with said forces.

3. A regulator comprising a motor, a pilot device to control the motor, a tension member, means to subject said member to a tensile stress by applying thereto two directly opposed and substantially equal forces, a control device to vary one of said forces, means actuated by the motor to vary the other of said forces, and a pivotally supported lever connecting the tension member and the pilot device, said lever being arranged to respond to movements of the tension member in the line of said forces.

4. A regulator comprising a motor, a pilot device to control the motor, a tension member, means to subject said member to a tensile stress by applying thereto two directly opposed and substantially equal forces, a control device to vary one of said forces, means actuated by the motor to vary the other of said forces, the tension member being shaped to provide two opposed parallel plane surfaces perpendicular to the line of said forces, and a pivotally supported lever connected to the pilot device and arranged to make point contact with each of said plane surfaces.

5. A regulator comprising a motor, a pilot device to control the motor, a member connected to the pilot device to actuate the same, a control device arranged to apply a variable force to the member, means including a spring connected to the member and arranged to apply a force thereto which is in direct line with and opposed to the said variable force, the member being stressed in tension by the combined effect of the two forces, and means actuated by the motor to vary the deflection of said spring, the member being free to align itself with said forces.

6. A regulator comprising a motor, a pilot device to control the motor, a member connected to the pilot device to actuate the same, a control device arranged to apply a variable force to said member, means including a coiled tension spring connected to the member in line with the said variable force, the member being stressed in tension by the combined effect of the control device and the spring, and means actuated by the motor to vary the deflection of the spring.

7. A regulator comprising a motor, a pilot device to control the motor, a member connected to the pilot device to actuate the same, a control device arranged to apply a variable force to said member, a spring to support the member in opposition to the variable force, a flexible element connected at one end to the spring and at the other end to the motor, and an idler wheel arranged to support the flexible element intermediate its ends.

8. A regulator comprising a motor, a pilot device to control the motor, a member connected to the pilot device to actuate the same, a control device arranged to apply a variable force to said member, a spring to support the member in opposition to the variable force, a flexible element connected at one end to the spring, a pivotally supported lever connected to the other end of the flexible element, means to swing the lever in response to movements of the motor, and an idler wheel arranged to support the flexible element intermediate its ends.

9. A regulator comprising a reversible motor operable between two limiting positions, a pilot device to control the motor, a member connected to the pilot device to actuate the same, a control device arranged to apply a variable force to said member, a spring to support the member in opposition to the variable force, a flexible element connected at one end to the spring, a pivotally supported lever arm connected to the other end of the flexible element, an idler wheel arranged to support the flexible element intermediate its ends, and means to swing the lever arm in response to movements of the motor, the lever arm being substantially at right angles to the adjacent portion of the flexible element when the motor is in one of its limiting positions.

10. A regulator comprising a motor having a reciprocable part, a pilot device to control the motor, a member connected to the pilot device to actuate the same, a control device arranged to apply a variable force to said member, a spring to support the member in opposition to the variable force, a flexible element connected at one end to the spring, a pivotally supported lever connected to the other end of the flexible element, an idler wheel arranged to support the flexible element intermediate its ends, and a link connecting the reciprocable part of the motor to the lever to swing the same.

11. A regulator comprising a motor having a reciprocable part, a pilot device to control the motor, a member connected to the pilot device to actuate the same, a control device to apply a variable force to said member, a spring to support the member in opposition to the variable force, a flexible element connected at one end to the spring, a pivotally supported lever having a long arm and a short arm, the short arm being connected to the other end of the flexible element, an idler wheel arranged to support the flexible element intermediate its ends, manually operable means to adjust the effective length of the short arm of the lever, and a link connecting the reciprocable part of the motor to the long arm of the lever to swing the same.

12. A regulator comprising a reversible motor operable between two limiting positions, a pilot device to control the motor, a member connected to the pilot device to actuate the same, a control device to apply a variable force to said member, a spring to support the member in opposition to the variable force, a flexible element connected at one end to the spring, a pivotally supported lever having a long arm and a short arm, the short arm being connected to the other end of the flexible element, an idler wheel arranged to support the flexible element intermediate its ends, and a link connecting the motor to the long arm of the lever to swing the same, the short arm of the lever being substantially at right angles to the adjacent portion of the flexible element when the motor is in one of its limiting positions.

13. A regulator comprising a motor, a pilot device to control the motor, a member connected to the pilot device to actuate the same, a flexible diaphragm arranged to be subjected to a variable fluid pressure and connected to the member, a spring to support the diaphragm against the fluid pressure, the spring and diaphragm cooperating to apply a variable force to the member, means including a second spring connected to the member and arranged to apply a force thereto which is in direct line with and opposed to the said variable force, the member being stressed in tension by the combined effect of the two forces, and means actuated by the motor to vary the deflection of the second spring.

14. A regulator comprising a motor, a pilot device to control the motor, a member connected to the pilot device to actuate the same, a flexible diaphragm arranged to be subjected to a variable fluid pressure and connected to the member, a spring to support the diaphragm against the fluid pressure, the spring and diaphragm cooperating to apply a variable force to the member, means including a coiled tension spring connected to the member in line with the said variable force, the member being stressed in tension by the combined effect of the tension spring and the variable force, and means actuated by the motor to vary the deflection of the tension spring.

15. A regulator comprising a motor, a pilot device to control the motor, a tension member connected to the pilot device to actuate the same, means including two tension springs arranged to subject said member to a tensile stress by applying thereto two directly opposed and substantially equal forces, a control device to vary the deflection of one of said springs, and means actuated by the motor to vary the deflection of the other of said springs.

16. A regulator comprising a motor, a pilot device to control the motor, a tension member, means including two tension springs arranged to subject said member to a tensile stress by applying thereto two directly opposed and substantially equal forces, a control device to vary the deflection of one of said springs, means actuated by the motor to vary the deflection of the other of said springs, and connections between the tension member and the pilot device arranged to respond to movements of the tension member in the line of said forces.

17. A regulator comprising a motor, a pilot device to control the motor, a tension member, two aligned coiled tension springs connected to the member and arranged to subject said member to a tensile stress by applying thereto two directly opposed and substantially equal forces, a control device to vary the deflection of one of said springs, means actuated by the motor to vary the deflection of the other of said springs, and connections between the tension member and the pilot device arranged to respond to movements of the tension member in the line of said forces.

18. A regulator comprising a motor, a pilot device to control the motor, a tension member, two aligned coiled tension springs connected to the member at opposite sides, a flexible element connected at one end to one of the springs and at the other end to the motor, an idler wheel arranged to support the flexible element intermediate its ends, a rotatable wheel, a second flexible element connected at one end to the other of said springs and at the other end to the rotatable wheel, means to rotate the wheel, and connections between the tension member and the pilot device arranged to respond to movements of the tension member in the line of said springs.

19. A regulator comprising a motor, a pilot device to control the motor, a tension member, means including two tension springs arranged to subject said member to a tensile stress by applying thereto two directly opposed and substantially equal forces, means actuated by the motor to vary the deflection of one of said springs, a rotatable wheel, a flexible element connecting the rotatable wheel with the other of said springs, connections between the tension member and the pilot device arranged to respond to movements of the tension member in the line of said forces, an arm connected to the wheel to rotate the same, and means for adjusting the angular relationship between the arm and the wheel.

PAUL C. TEMPLE.